ID
2,857,338
LOSSY MATERIALS FOR MICROWAVE ATTENUATORS

John C. Rolfs, Williston Park, and Leopold Brecht, Hicksville, N. Y., assignors to Sperry Rand Corporation, a corporation of Delaware No Drawing. Application August 26, 1954
Serial No. 452,469

3 Claims. (Cl. 252—503)

This invention relates to a composition of matter constituting an improved lossy substance for dissipating high frequency radio wave energy. One of the principal applications of such materials is in devices for attenuating or absorbing microwave radio energy. When relatively large quantities of power are to be dissipated, as in high power dummy loads, it is necessary not only that the lossy material have the proper electrical characteristics, but also that it be resistant to high temperatures. Furthermore, it is desirable that the material be adherent to metallic surfaces, and that it have sufficient strength to be self supporting and to prevent mechanical failure as by cracking or crumbling.

Accordingly it is the principal object of this invention to provide an improved composition of matter that has a high loss factor for microwave radio energy, is unaffected both electrically and mechanically by temperatures up to red heat, is highly coherent, and is adherent to metallic surfaces such as wave guide walls.

Another object is to provide a material having the above characteristics which consists of inexpensive and readily obtainable ingredients.

A further object is to provide a method of combining and treating said ingredients to achieve the desired electrical and mechanical properties.

The lossy material of this invention is the product of a mixture with water of a powder containing, by weight:

| | Percent |
|---|---|
| Iron | 30–55 |
| Calcium sulphate | 5–12 |
| Carbon | 1½–5 |
| Sulphur | ½–3 |
| Inert refractory filler | Remainder |

Preferably the iron, calcium sulphate, carbon and sulphur are mixed as powders and ball milled or otherwise treated to make the mixture have a bulk factor of approximately 2. Then the filler material, which may be for example silicon carbine, is added in powdered form and mixed thoroughly with the other powdered ingredients.

The dry powder may be stored indefinitely, to be mixed with water when it is to be used. At that time sufficient water is added to make a paste which is spread or molded into place in the attenuator structure or wherever the body of lossy material is to be formed. This step should be performed promptly after the paste is mixed, before it begins to set.

The material is allowed to dry in air until it is well set, say for several hours, after which the surface may be smoothed if necessary with emery paper or similar abrasive material. Then it is baked, preferably for several hours, at a temperature somewhat below the boiling point of water, to remove the excess moisture without steaming. After this preliminary baking the body of material is baked again for an extended period at an elevated temperature, preferably somewhat higher than the highest temperature that is to be expected in the operation of the finished device.

After baking, the hardened and dried material may be coated with a heat resistant enamel, such as a silicone base aluminum enamel. Then it may be air dried for 15 to 20 minutes, and baked again at high temperature for about one hour.

The resulting body of material exhibits the properties of high loss at microwave frequencies, high mechanical strength, and stability at temperatures up to the melting point of aluminum.

A typical example of the preparation of the lossy material as presently preferred is as follows. Approximately one pound of dry powdered mixture was made, containing

| | Grams |
|---|---|
| 100 mesh iron powder | 375 |
| Calcium sulphate (as plaster of Paris) | 75 |
| Carbon black | 25 |
| Sulphur | 14.6 |

This mixture was ball milled for 18 consecutive hours in a porcelain ball mill 5.2 x 5.7" at a speed of 122 R. P. M. using balls of approximately ½ inch diameter. After ball milling, the mixture was mixed with 220 mesh silicon carbide, in the ratio of four parts of the mixture to three parts of silicon carbide, by weight.

The paste was made by adding approximately 6 cc. of water for each ounce of powder. After molding, the paste was allowed to dry in air at room temperature for four hours. The initial baking was at 150° F., for six hours. The first high temperature baking was at 600° F., for eight hours, and the final baking, after enamelling, at 600° F. for one hour.

While a specific example has been given of the proportions of the ingredients and the temperatures, times and sequence of steps in their treatment, it is to be understood that this is by way of illustration only of the best presently known manner of practicing the invention, and that the proportions and other factors may be varied throughout substantial ranges without serious degradation of the electrical or mechanical properties of the finished product.

What is claimed is:

1. The method of making a body of lossy material for absorbing microwave radio energy, comprising the steps of producing a powdered mixture containing by weight approximately 15 percent plaster of Paris, 5 percent carbon black, one percent sulphur, the remainder iron; ball milling said mixture to obtain a bulk factor of approximately two, adding powdered silicon carbide to said mixture in the approximate proportions by weight of three parts silicon carbide to four parts of the original mixture, adding water to form a paste, molding said paste in the form of the body to be made, air drying said paste at room temperatures until set, baking the set material at a temperature below the boiling point of water to remove excess moisture, and baking the dried material at approximately the highest temperature at which the body of lossy material is to be used.

2. The method claimed in claim 1, wherein said first baking is at 150° F. for a period of six hours, and said second baking is at 600° for eight hours.

3. A lossy material for absorbing microwave radio energy, having the characteristics of high loss factor, high coherence, and adherence to metallic surfaces, said characteristics being substantially unaffected by temperatures up to red heat, said material comprising the solidified and heat-dried product of a mixture with water of a powder containing, by weight:

| | Percent |
|---|---|
| Iron | 30–55 |
| Plaster of Paris | 5–12 |
| Carbon black | 1½–5 |
| Sulphur | ½–3 |
| Silicon carbide | Remainder | said mixture being in the form of a paste which, after molding to a desired shape, is baked at a temperature and for a period sufficient to drive out substantially all water from said mixture.

References Cited in the file of this patent

UNITED STATES PATENTS

| | | |
|---|---|---|
| 339,569 | McCormic | Apr. 6, 1886 |
| 2,453,645 | Tiley | Nov. 9, 1948 |
| 2,464,006 | Tiley | Mar. 8, 1949 |
| 2,610,250 | Wheeler | Sept. 9, 1952 |

OTHER REFERENCES

Smith's College Chemistry, 6th ed., 1946, p. 525.